United States Patent
Kohnen et al.

[11] Patent Number: 5,831,873
[45] Date of Patent: Nov. 3, 1998

[54] MAGNETIC DIPOLE TARGET CLASSIFIER AND METHOD

[76] Inventors: Kirk K. Kohnen, 1630 Via Linda, Fullerton, Calif. 92833-1576; Harold C. Gilbert, 212 Koch Ave.; Wilbur W. Eaton, Jr., 301 Bagnall Ave., both of Placentia, Calif. 92870

[21] Appl. No.: 789,032
[22] Filed: Jan. 27, 1997
[51] Int. Cl.$^6$ .................................................. G01R 33/12
[52] U.S. Cl. ...................................... 364/559; 364/449.1
[58] Field of Search ................................... 364/550, 556, 364/559, 423.098, 449.1, 424.012; 33/355 R, 361; 340/988, 995; 324/207.22, 207.26, 200, 207.13, 207.11, 247, 244

[56] References Cited

U.S. PATENT DOCUMENTS

| | | | |
|---|---|---|---|
| 4,600,883 | 7/1986 | Egli et al. | 324/207 |
| 4,622,644 | 11/1986 | Hansen | 364/559 |
| 5,239,474 | 8/1993 | Eaton, Jr. et al. | 364/449 |
| 5,264,793 | 11/1993 | Lo et al. | 324/207.13 |
| 5,337,259 | 8/1994 | Breed | 364/559 |
| 5,387,863 | 2/1995 | Lo et al. | 324/207.13 |
| 5,524,086 | 6/1996 | Kiyuna et al. | 364/527 |
| 5,684,396 | 11/1997 | Aks et al. | 324/207.13 |

*Primary Examiner*—Emanuel Todd Voeltz
*Assistant Examiner*—Craig Steven Miller
*Attorney, Agent, or Firm*—David W. Collins; Leonard A. Alkov; Glenn H. Lenzen, Jr.

[57] ABSTRACT

A target's magnetic dipole includes both a permanent component and an induced component that is caused by the interaction of the target at a given heading with the ambient magnetic field. In order to accurately classify targets, a library of characterization matrices is built for a plurality of candidate targets. The matrices characterize what the magnetic dipoles would be in a given ambient magnetic field at a particular heading. In practice, some localization algorithm is used to provide a target's magnetic dipole and heading. Magnetic dipoles for each of the candidate targets are predicted using the target's heading, the ambient magnetic field, and the characterization matrices. The target is then classified as the candidate target(s) providing the best match to the target's measured magnetic dipole.

22 Claims, 4 Drawing Sheets

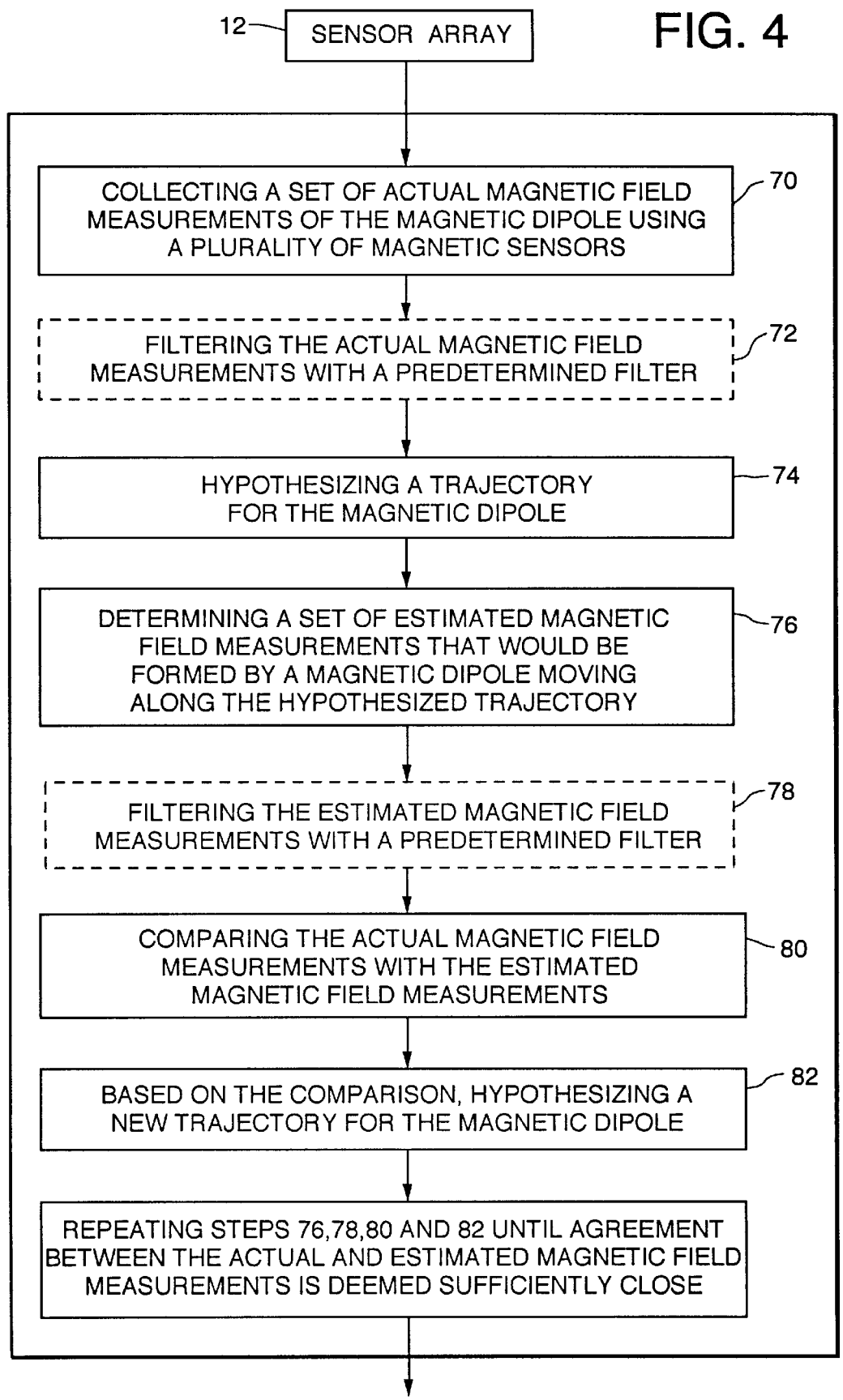

MAGNETIC DIPOLE TARGET CLASSIFIER AND METHOD

RELATED APPLICATIONS

This application is related to copending U.S. patent applications Ser. No. 08/611,352, entitled "Localizing Magnetic Dipoles using Spatial and Temporal Processing of Magnetometer Data" now U.S. Pat. No. 5,684,396, and Ser. No. 08/611,291, entitled "Improved Dipole Moment Detector and Localizer" now pending both filed Mar. 5, 1996, and assigned to Hughes Electronics.

BACKGROUND OF THE INVENTION

1. Field of the Invention

This invention relates generally to magnetometer data processing methods and apparatus for localizing magnetic dipoles, and more specifically to a method and apparatus for classifying magnetic dipoles.

2. Description of the Related Art

Metal objects such as firearms, automobiles, ships, submarines, and airplanes, for example, have magnetic dipole moments that can be used to detect them. Historically, magnetic field sensors have been used to detect (but not locate) such objects. Magnetic dipole detectors developed by the assignee of the present invention have been used to localize objects in two ways. One implementation uses a single sensor and data is sensed over a period of time to localize the magnetic dipole (target). The other implementation uses an array of sensors, and a local time average of each sensor output is determined. This data is processed to determine the location (but not the velocity nor heading) of the target. Both techniques make an implicit assumption that the target of interest is relatively stationary while the measurements are being taken. The data is also processed to determine the target's magnetic dipole (strength and orientation).

U.S. Pat. No. 5,239,474 to Eaton et al. entitled "Dipole Moment Detection and Localization" assigned to the assignee of the present invention discloses a dipole moment detection and localization algorithm. The algorithm is commonly referred to as a "snapshot" algorithm because it processes data taken at a single instant in time. As a result, the snapshot algorithm does not provide an indication of the velocity or heading of the target as a direct output thereof. The data can be processed to compute the target's magnetic dipole.

In these systems, the target's magnetic dipole has been used only to perform gross classifications, e.g. whether the target is a submarine or not. This is because the target's magnetic dipole is a function of not only its permanent magnetic dipole, which is constant, but also an induced magnetic dipole, which itself is a function of the ambient magnetic field and the target's heading. Thus, only targets having gross disparities in their magnetic dipoles can be distinguished.

SUMMARY OF THE INVENTION

In view of the above problems, the present invention provides a method and apparatus for accurately classifying magnetic dipoles.

This is accomplished by collecting a set of magnetometer data for a target and processing the data to estimate the target's magnetic dipole and heading. The magnetic dipole and ambient magnetic field are then rotated into a target centered coordinate system. The characterization matrices for a plurality of candidate targets are multiplied by the ambient field to produce respective candidate magnetic dipoles in the target centered coordinate system, which are then matched against the target's magnetic dipole. The target is classified as the one or more (if the results are ambiguous) candidate targets that provide a good match.

Each of the characterization matrices define the interaction of a different target with the ambient magnetic field that generates an induced component of the target's magnetic dipole and specify the target's permanent magnetic dipole component. The library of characterization matrices is built by passing each target through different ambient field conditions at different headings and then solving for the matrix parameters that will most accurately predict the target's magnetic dipole in a given ambient magnetic field at a given heading.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 4 is a flow diagram illustrating a preferred spatial/temporal algorithm for computing the target's magnetic dipole and heading as shown in FIG. 1.

DETAILED DESCRIPTION OF THE INVENTION

The present invention provides a system and method for classifying magnetic targets. A target's magnetic dipole includes both a permanent component and an induced component that is caused by the interaction of the target at a given heading with the ambient magnetic field. The invention provides a method for predicting what the magnetic dipoles would be for a plurality of candidate targets in the measured ambient magnetic field conditions at the computed heading. The target is then classified as the candidate target (s) providing the best match to the target's measured magnetic dipole.

Figure 1:
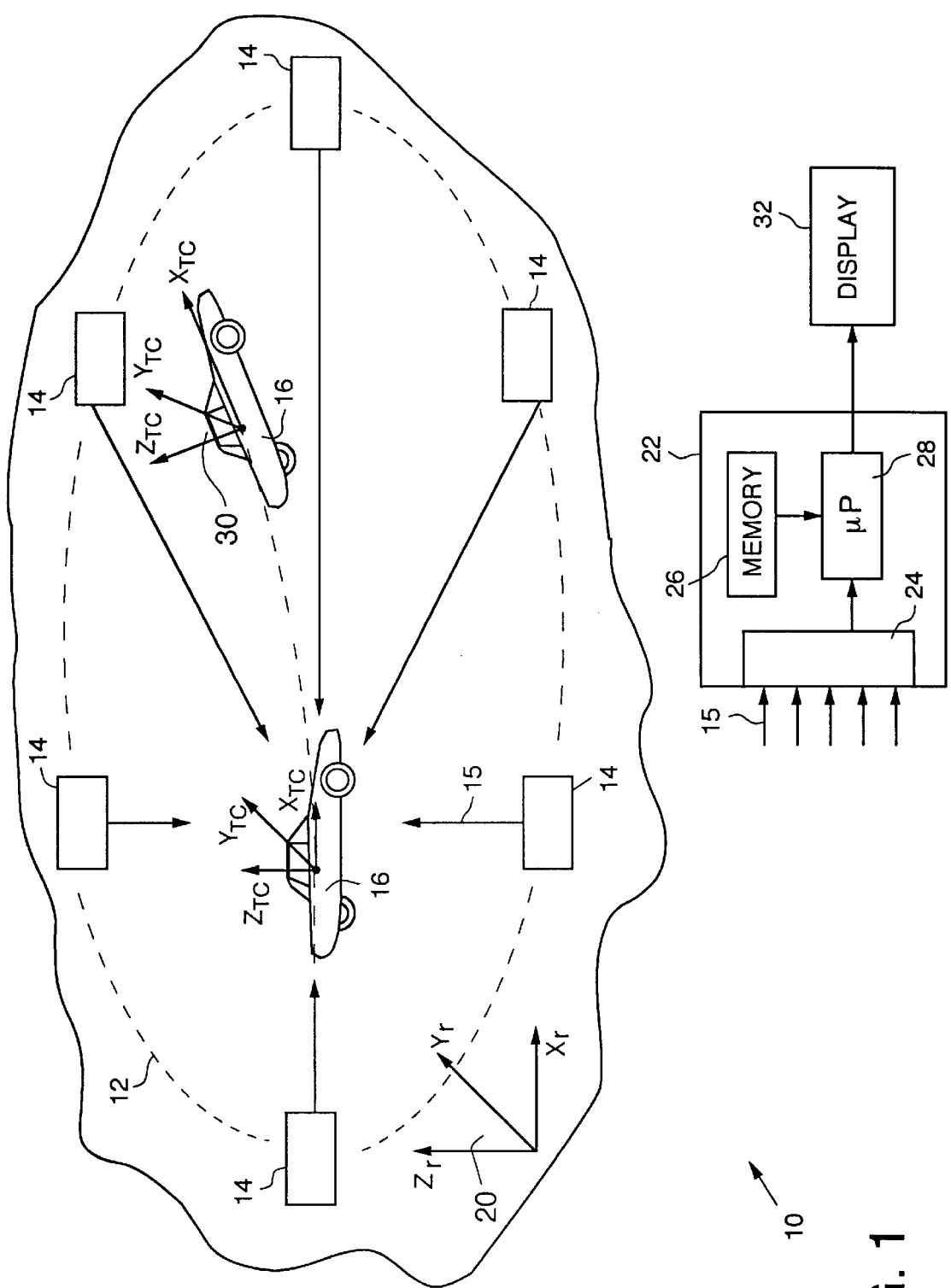
FIG. 1 shows a system for classifying a magnetic target in accordance with the principles of the present invention.

FIG. 1 shows a magnetic dipole classifier 10 in accordance with the principles of the present invention. The magnetic dipole classifier 10 suitably comprises an arbitrarily positioned array 12 of magnetic sensors 14 that collect magnetic field measurements 15 of a magnetic dipole (or target) 16 that is located within the detection range of the array 12. The ambient magnetic field is suitably measured before of after the target passes through the array. The positions of the sensors are specified in a three dimensional reference coordinate system $(X_r, Y_r, Z_r)$ 20 such as earth coordinates, array coordinates referenced to earth coordinates, or some other known coordinate system. Alternately, the sensors' locations could be represented in a spherical or other 3-dimensional coordinate system.

The array of magnetic sensors 14 are coupled to a computer 22 by a hard wire network, an RF data link, a microwave data link, or other appropriate means. The computer 22 includes an input port 24 for receiving the magnetic field measurements, a memory 26 for storing the characterizations of the candidate targets, and a microprocessor 28 which implements the processing methods described in FIGS. 2–4 to either characterize a candidate target or classify the actual target 16.

In either case, the microprocessor 28 first computes the target's heading and magnetic dipole in reference coordinates. One approach is to use Eaton's "snapshot" localization algorithm twice on two independent sets of measurements and then compute the heading between the two points. A better approach is to use a spatial/temporal localization algorithm, which processes a temporal window of measurements and outputs the target's velocity, from which its heading can be computed directly. The spatial/temporal algorithm is described in detail in copending U.S. patent application Ser. No. 08/611,352 filed Mar. 5, 1996 by Stan Aks and Kirk Kohnen entitled "Localizing Magnetic Dipoles using Spatial and Temporal Processing of Magnetometer Data," which is also assigned to Hughes Electronics, and which is included herein in reference to FIG. 4. However, the classification process is independent of the specific method used to compute the target's magnetic dipole and heading. For example, any magnetic detection and localization system, which may or may not employ an array of magnetic sensors, in which the magnetic dipole and velocity are determined could be used. Once computed, the target's magnetic dipole and the ambient magnetic field are then rotated from the reference coordinates into target centered coordinates in a target centered coordinate system ($X_{TC}$, $Y_{TC}$, $Z_{TC}$) 30 using the measured heading. The target centered coordinates are given in Cartesian coordinates but could be just as easily described in spherical coordinates, for example.

To characterize a candidate target, the data gathering process is repeated several times under different ambient conditions and headings to gather enough data from which an accurate characterization of the target's permanent magnetic dipole and its interaction with the ambient field can be made. The characterization is suitably represented as a matrix [T] that specifies the target's permanent magnetic dipole component and defines the interaction of the target with a given ambient field in target centered coordinates, which produces an induced magnetic dipole component. Thus, each matrix [T] characterizes what the magnetic dipole will be in target centered coordinates in a given ambient magnetic field. For purposes of simplicity and without loss of generality, the mapping represented by matrix [T] is assumed to be a first order linear function. Higher order mappings such as second or third order approximations may provide more accurate classification but would entail a significant increase in complexity. The method for computing each characterization matrix [T] and building the library is illustrated in detail in FIG. 2.

To classify an actual target, the characterizations for each candidate target are weighted by the rotated ambient field to predict what their dipoles would be under the measured conditions. Typically, the best match to the actual magnetic dipole in target centered coordinates is selected. A null classification may result if none of the matches are deemed good enough. Alternately, the target may be identified as being one of a small subset of candidates if the results are ambiguous. Thereafter, the location, heading and classification data are displayed on a display 32 so that the target can be accurately identified as well as tracked.

Figure 2:
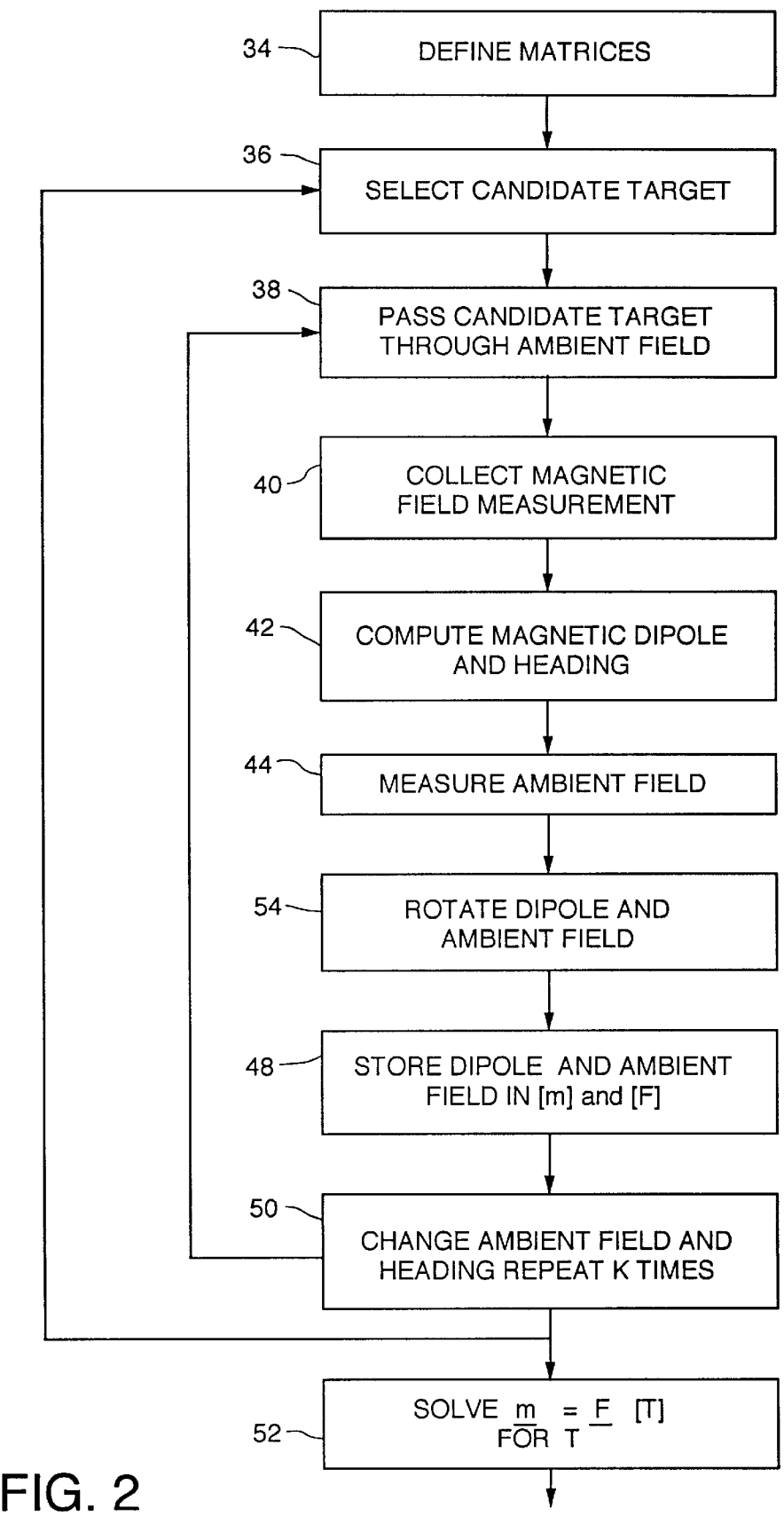
FIG. 2 shows a flow diagram illustrating the process for building the library of target characterization matrices.

FIG. 2 illustrates the process for building the library of candidate target characterization matrices [T]. The first step 34 is to define the matrices. Assuming a first order linear model, the magnetic dipole of a target is expressed as:

$$\underset{1\times 3}{m_{act}} = \underset{1\times 4}{F} \underset{4\times 3}{[T]} \quad (1)$$

where the target magnetic dipole is defined by:

$$\underline{m}_{act} = [m_x, m_y, m_z] \quad (2)$$

and $m_x$, $m_y$ and $m_z$ are the components of the magnetic dipole expressed in units of Magnetic Field x Length$^3$ such as nT ft$^3$ in the direction of the X, Y, and Z vectors in the target centered coordinated system. A matrix [M] is defined as a k×3 matrix, in which each row is the magnetic dipole $\underline{m}_{act}$ of a different one of k experiments.

The ambient magnetic field vector is defined as $\underline{F} = [F_x, F_y, F_z, 1]$ where the first three columns are the ambient magnetic field in target centered coordinates and the last column is the constant 1 with no units. A matrix [F] is defined as a k×4 matrix, in which each row is the ambient field vector $\underline{F}$ of a different experiment.

The characterization matrix [T] is a matrix of characteristic parameters that indicates what the magnetic dipole will be for a given target in a given ambient magnetic field represented in target centered coordinates and is expressed by:

$$[T] = \begin{bmatrix} T_{XX} & T_{XY} & T_{XZ} \\ T_{YX} & T_{YY} & T_{YZ} \\ T_{ZX} & T_{ZY} & T_{ZZ} \\ T_{PX} & T_{PY} & T_{PZ} \end{bmatrix} \quad (3)$$

where the first three rows of [T] have units Length$^3$ (ft$^3$) and the last row has the same units as the magnetic dipole. The first three rows are scale factors that interact with the ambient field to produce the induced magnetic component. The last row is the permanent magnetic dipole, which does not interact with the ambient field (this is why a 1 is appended to the ambient field vector), and thus is expressed in units nT ft$^3$.

The first column of [T] determines the X (in target centered coordinates) component of the magnetic dipole of the candidate target. The first three elements of this column indicate the relative importance of the X, Y, and Z values of the ambient magnetic field (in a target centered coordinates system) in determining the $m_x$ component of the target's magnetic dipole. The fourth element of the column characterizes the permanent component of the magnetic dipole, which does not interact with the ambient field. The elements in the second and third columns of [T] similarly determine the importance of the different components in determining the $m_y$ and $m_z$ components.

Once the matrices [M], [F] and [T] are defined, the first candidate target is selected (step 36). In step 38, the candidate target is suitably passed through an array of magnetic sensors such as shown in FIG. 1 under a given ambient magnetic field and with a given heading. Thereafter, the magnetic field measurements are collected (step 40) and the target's magnetic dipole $\underline{m}_{act}$ and heading are computed (step 42). The ambient magnetic field is measured (step 44) and both it and the magnetic dipole $\underline{m}_{act}$ are rotated into target centered coordinates using the measured heading (step 46). This type of coordinate transformation is well known and described in *Standard Mathematic Tables,* 20th Edition, editor Samuel M. Shelby, The Chemical Rubber Co. 1972, p. 368.

The rotated dipole M and ambient field are stored in the next available rows in matrices [M] and [F], respectively (step 48). In step 50, the ambient field is changed by tilting the target fore and aft and left and right, performing the tests in different geographical areas of the world, or performing the tests in a huge Helmholtz coil which would provide an artificial ambient field. The target's heading through the array is also changed. Steps 36 through 50 are repeated several times in order to gather a wide variety of test data.

The values of the characteristic parameters in matrix [T] are computed by solving the equation:

$$[M]=[F][T] \quad (4)$$

One approach is the well known least squares error (LSE) solution in which:

$$[T]=([F]^T[F])^{-1}[F]^T[M] \quad (5)$$

To use the LSE approach, at least k=4 different measurements must be taken for $F^T F$ to have full rank and thus be invertible. Typically, k should be much larger than 4 to minimize the impact of measurement errors. Other procedures such as a detailed finite element analysis of the constituent magnetic components of the target and their interactions can be used to solve for the characteristic parameters.

If a candidate target consists entirely of a strong permanent magnet, its characterization matrix would look like:

$$[T] = \begin{bmatrix} 0 & 0 & 0 \\ 0 & 0 & 0 \\ 0 & 0 & 0 \\ T_{PX} & T_{PY} & T_{PZ} \end{bmatrix} \quad (6)$$

Conversely, if the candidate target is made of ferrous material, which interacts with an ambient field, but is itself not at all magnetized, its [T] matrix would look like:

$$[T] = \begin{bmatrix} T_{XX} & T_{XY} & T_{XZ} \\ T_{YX} & T_{YY} & T_{YZ} \\ T_{ZX} & T_{ZY} & T_{ZZ} \\ 0 & 0 & 0 \end{bmatrix} \quad (7)$$

Finally, a target that is not magnetically detectable such as a weather balloon would have a [T] matrix of all zeros.

Figure 3:
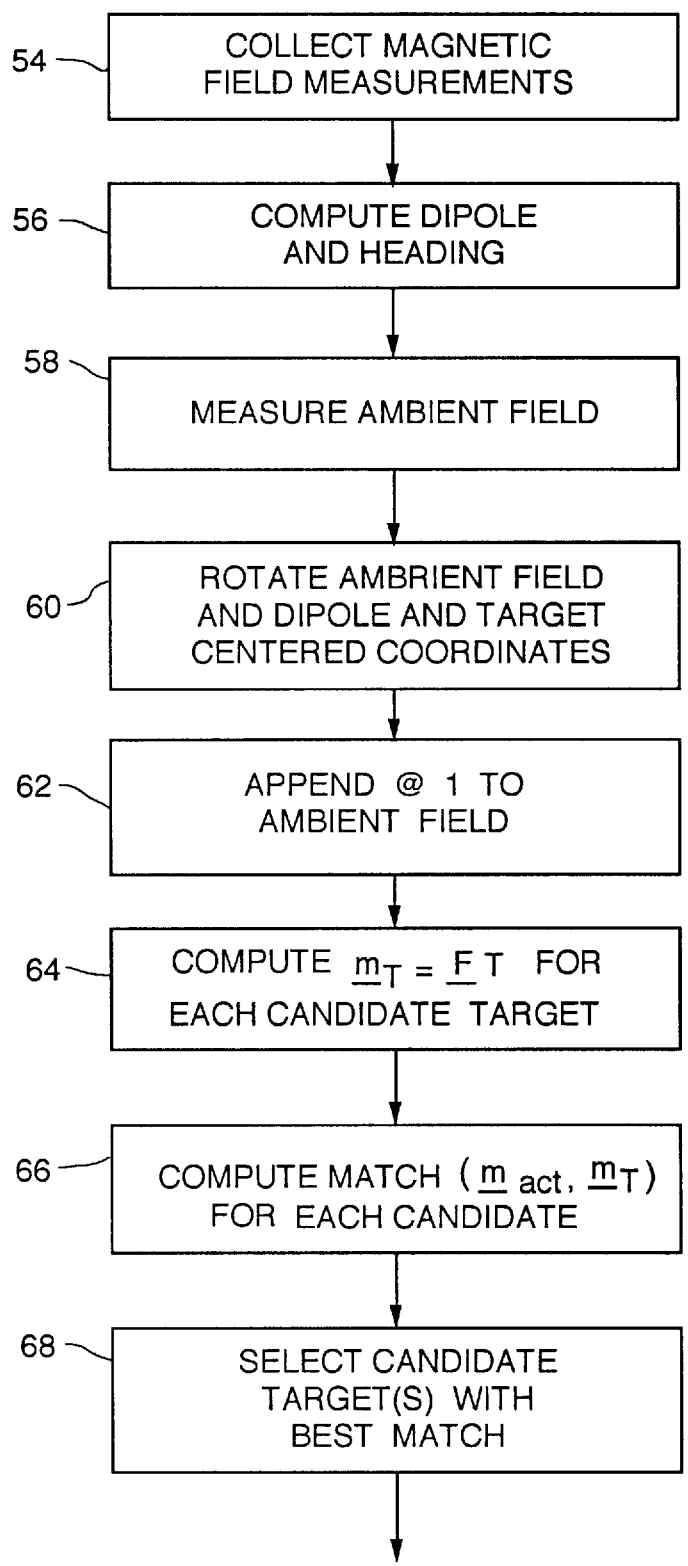
FIG. 3 is a flow diagram illustrating the process for classifying the magnetic targets.

Referring to FIG. 3, an actual target is detected and classified by first collecting a set of actual magnetic field measurements, suitably from an array of magnetic field sensors such as those shown in FIG. 1 (step 54). The magnetic field measurements are collected into a vector $\underline{B}_R$, which is modeled as:

$$\underline{B}_R=[R_R]\underline{m}_{act} \quad (8)$$

where $[\underline{R}_R]$ is a matrix that defines the spatial mapping from the sensors to the target and $\underline{m}_{act}$ is the target's magnetic dipole. In the "snapshot" algorithm, $[\underline{R}_R]$ is a function of three unknowns $(x_o,y_o,z_o)$, which together define the target's location. In the spatial/temporal algorithm, $[\underline{R}_R]$ is a function of six unknowns $(x_o,y_o,z_o,v_x,v_y,v_z)$, which provide the target's velocity in addition to its position. Equation 8 is solved for the values of the (3 or 6) unknowns in $[\underline{R}_R]$ and the 3 unknowns in $\underline{m}_{act}$ that provide the best match to the magnetic field measurements $\underline{B}_R$. In general, this is accomplished by maximizing the correlation $(\underline{B}_R^T[\underline{R}_R][[\underline{R}_R^T][\underline{R}_R]]^{-1}[\underline{R}_R]^T\underline{B}_R)$ (step 56). The target's heading in reference coordinates is computed either as a vector between two successive locations (snapshot algorithm) or as the arctangent to the velocity vector output by the spatial/temporal algorithm.

The invention then uses this information (the target's magnetic dipole and heading) in conjunction with the library of characterization matrices [T] to classify the target. In step 58, the ambient magnetic field is measured in reference coordinates. In step 60, the ambient magnetic field and magnetic dipole are rotated into target centered coordinates. A constant one is appended to the ambient magnetic field to form a vector F of length four (step 62). This merely facilitates a simple way of adding the induced magnetic dipole generated by the interaction of the target and the ambient field to the target's permanent magnetic dipole.

In step 64, an estimate of what the magnetic dipoles $\underline{m}_T$ would be under the measured ambient conditions in target centered coordinates is computed as:

$$\underset{1 \times 3}{m_T} = \underset{1 \times 4}{F} \underset{4 \times 3}{[T]} \quad (9)$$

for each of the candidate targets in the library. In step 66, a measure of the match between the actual dipole $\underline{m}_{act}$ and the predicted magnetic dipoles $\underline{m}_T$ is computed. Typical measures include the euclidean distance, a normalized euclidean distance or a weighted euclidean distance. In step 68, the candidate target(s) with the best match are selected. If the match is not good enough then a null classification is declared. If the match is ambiguous, the algorithm outputs a small subset of possible candidate targets.

By compensating for the induced magnetic dipole, the invention can distinguish not only between different classes of targets such as whether a target is a submarine or not but can discriminate between different targets within a class such as tanks, jeeps, cars and types of tanks, jeeps or cars. This vastly expands the number of applications where magnetic processing can be used to classify targets and increases the confidence with which the results can be believed.

FIG. 4 shows a flow diagram illustrating the spatial/temporal algorithm for computing a target's location and velocity and its magnetic dipole. The first step 70 involves collecting a set of actual magnetic field measures of the target using a plurality of magnetic sensors. Optionally, the actual magnetic field measurements may be filtered to remove noise, as shown in step 72. In the next step 74, a heading for the target is hypothesized, and a set of estimated magnetic field measurements is determined (step 76) that would be formed a target moving along the hypothesized heading. In the event that the actual magnetic field measurements have been filtered, the estimated magnetic field measurements are also filtered (step 78). Then in the next step 80, the actual magnetic field measurements are compared with the estimated magnetic field measurements. Then, based on the comparison, a new heading for the magnetic dipole is hypothesized (step 82). Steps 76 through 82 are repeated until agreement between the actual magnetic field measurements and the estimated magnetic field measurements is deemed sufficiently close.

The spatial and temporal processing performed by the algorithm is mathematically described as follows. The magnetic field at a point in space due to the presence of a magnet target is given by the basic equation:

$$\underline{B}=(1/r^5)[3(\underline{m}\cdot\underline{r})\underline{r}-r^2\underline{m}] \quad (10)$$

where:

$\underline{B}$ is the magnetic field vector, given by:

$$\underline{B}=B_x\hat{i}+B_y\hat{j}+B_z\hat{k} \quad (11)$$

$\underline{m}$ is the dipole moment vector, given by:

$$\underline{m}=m_x\hat{i}+m_y\hat{j}+m_z\hat{k} \quad (12)$$

$\underline{r}$ is the position vector, given by:

$$\underline{r} = r_x\hat{i} + r_y\hat{j} + r_z\hat{j} \tag{13}$$

$\underline{r}$(t) is the position in the magnetic field with respect to the position of the dipole moment, given by:

$$\underline{r}(t) = \underline{r}_s - \underline{r}_d(t) \tag{14}$$

$\underline{r}_s$ is the position at which the magnetic field equals $\underline{B}$, and $\underline{r}_d(t)$ is the position of the dipole moment at time t.

After substituting the vector components and simplifying, the basic equation becomes:

$$\underline{B} = \frac{1}{r^5} \begin{vmatrix} (2r_x^2 - r_y^2 - r_z^2)m_x + (3r_xr_y)m_y + (3r_xr_z)m_z \\ (3r_xr_y)m_x + (2r_y^2 - r_x^2 - r_z^2)m_y + (3r_yr_z)m_z \\ (3r_xr_z)m_x + (3r_yr_z)m_y + (2r_z^2 - r_x^2 - r_y^2)m_z \end{vmatrix} \tag{15}$$

where:

$$r^5 = (r_x^2 + r_y^2 + r_z^2)^{5/2}. \tag{16}$$

The position matrix [R] may be defined as:

$$[R] = \frac{1}{r^5} \begin{vmatrix} 2r_x^2 - r_y^2 - r_z^2 & 3r_xr_y & 3r_xr_z \\ 3r_xr_y & 2r_y^2 - r_x^2 - r_z^2 & 3r_yr_z \\ 3r_xr_z & 3r_yr_z & 2r_z^2 - r_x^2 - r_y^2 \end{vmatrix}. \tag{17}$$

Then, by substitution:

$$\underline{B} = [R]\underline{m}. \tag{18}$$

The position matrix [R] is a function of the relative positions of the target and the point in space where the magnetic field equals $\underline{B}$.

Assume that the array of magnetic sensors is arbitrarily arranged in three-dimensional space such as is shown in FIG. 1. Each sensor of the array measures the three components of the local magnetic field. The sensors are oriented so that their respective axes are parallel to each other. Further assume that the target is moving along a heading in three-dimensional space given by:

$$\underline{r}_d(t) = (x_o + v_x t)\hat{i} + (y_o + v_y t)\hat{j} + (z_o + v_z t)\hat{k}. \tag{19}$$

Define the measurements of the magnetic field at the array of sensors by a composite vector:

$$\underline{B}_R = \begin{vmatrix} \underline{B}_{11} \\ \underline{B}_{21} \\ \cdots \\ \underline{B}_{N1} \\ \underline{B}_{12} \\ \underline{B}_{22} \\ \cdots \\ \cdots \\ \underline{B}_{(N-1)T} \\ \underline{B}_{NT} \end{vmatrix} \tag{20}$$

where N is the number of sensors, and [T] is the number of times sensors are sampled.

The position matrix for the array may be defined by the composite matrix:

$$[\underline{R}_R] = \begin{vmatrix} [R]_{11} \\ [R]_{21} \\ \cdots \\ [R]_{N1} \\ [R]_{12} \\ [R]_{22} \\ \cdots \\ \cdots \\ [R]_{(N-1)T} \\ [R]_{NT} \end{vmatrix} \tag{21}$$

Then for the array, the expansion of 18 becomes:

$$\underline{B}_R = [\underline{R}_R]\underline{m} \tag{22}$$

If $\underline{B}_R$ is a set of measurements representing the field of a target moving along an assumed heading $\underline{r}_d(t) = (x_o + v_x t)\hat{i} + (y_o + v_y t)\hat{j} + (z_o + v_z t)\hat{k}$, solving equation 22 for $\underline{m}$ provides an estimate of the magnetic dipole vector. It is to be understood that the heading of the target is not limited to this form, but may be any continuous function. At this point, assume that other significant magnetic sources, such as the earth's magnetic field and local geomagnetic distortions, have been subtracted from the measurements. Define the pseudo-inverse of the array position matrix as:

$$[\hat{\underline{R}}_R] = [[\underline{R}_R]^T[\underline{R}_R]]^{-1}[\underline{R}_R]^T. \tag{23}$$

Then the estimated dipole vector is:

$$\underline{m}_{est} = [\hat{\underline{R}}_R]\underline{B}_R. \tag{24}$$

The correlation coefficient will now be derived. The goodness of the estimated dipole vector of the target is evaluated as the correlation coefficient between the actual sensor measurements and ideal sensor measurements derived from the estimated dipole vector. Define the set of ideal measurements as:

$$\underline{B}_I = [\underline{R}_R]\underline{m}_{est} \tag{25}$$

By subtracting the mean from the sets of actual and ideal measurements, zero-mean vectors are obtained that are given by:

$$\underline{B}_{R0} = \underline{B}_R - \frac{1}{N} \Sigma \underline{B}_R, \tag{26}$$

and $$\underline{B}_{I0} = \underline{B}_I - \frac{1}{N} \Sigma \underline{B}_I. \tag{27}$$

Then, the correlation coefficient is:

$$\rho = \frac{\underline{B}_{R0}^T \underline{B}_{I0}}{\sqrt{(\underline{B}_{R0}^T \underline{B}_{R0})(\underline{B}_{I0}^T \underline{B}_{I0})}}. \tag{28}$$

The estimate of measurements will now be discussed. $\underline{B}_I$ is an estimate of the realizable measurements at the sensors that best fits the actual sensor measurements $\underline{B}_R$. If the expression for $\underline{m}_{est}$ is substituted into the equation for $\underline{B}_I$, a direct estimate of the ideal measurements is obtained:

$$\underline{B}_I = [\underline{R}_R][\hat{\underline{R}}_R]\underline{B}_R. \tag{29}$$

Define the measurement estimation matrix:

$$[S]=[R_R][\underline{R_R}] \tag{30}$$

which, in expanded form is:

$$[S]=[R_R][[R_R]^T[R_R]]^{-1}[R_R]^T. \tag{31}$$

Then, substituting equation 30 into equation 29 yields:

$$\underline{B_I}=[S]\underline{B_R}. \tag{32}$$

[S] is a function of sensor positions and hypothesized target position. It has the properties of being symmetrical and optimal in that:

$$[S]=[S]^T \tag{33}$$

and $$[S]=[S]^2. \tag{34}$$

Equation 33 shows that the estimator [S], when applied to an ideal set of measurements $\underline{B_I}$, reproduces the set of ideal measurements as an optimal estimate.

To estimate the heading of the target, the value of the correlation coefficient defined in equation 28 is maximized by varying the values of the six parameters $(x_o, y_o, z_o, v_x, v_y, v_z)$ that define the target's heading. The target's heading is then computed as the arctangent of the velocity vector $(v_x, v_y, v_z)$ and the target's dipole is computed using equation 24.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of classifying a target, comprising:

a) defining a library of candidate targets;

b) characterizing what the magnetic dipoles will be in a target centered coordinate system for each of the candidate targets in a given ambient magnetic field rotated into said target centered coordinate system;

c) collecting a set of actual magnetic field measurements of a target;

d) computing the target's heading and magnetic dipole;

e) measuring the ambient magnetic field;

f) rotating the target's magnetic dipole and the ambient magnetic field into the target centered coordinate system;

g) using the characterizations of the candidate targets to predict their magnetic dipoles in the measured and rotated ambient magnetic field; and g) classifying the target as the candidate target whose magnetic dipole is the best match to the target's rotated magnetic dipole.

2. The method of claim 1, wherein each said candidate target is characterized by a function that defines the interaction of the candidate target with the rotated ambient field which generates an induced magnetic dipole and specifies the target's permanent magnetic dipole that together form the its magnetic dipole.

3. The method of claim 2, wherein each said function is computed by:

h) passing the candidate target through an ambient magnetic field with a given heading;

i) collecting magnetic field measurements of the target as it passes through the field;

j) computing the target's magnetic dipole and heading in a three-dimensional reference coordinate system;

k) measuring the ambient field in the three-dimensional reference coordinate system;

l) rotating the target's magnetic dipole and the measured ambient field into the target centered coordinate system;

m) storing the rotated magnetic dipoles and rotated ambient fields;

n) repeating steps h through m k times under different ambient magnetic field conditions and with different target headings; and o) solving for the function that maps the rotated ambient fields into their associated rotated magnetic dipoles in accordance with a selected error function.

4. The method of claim 2, wherein said function is a first order linear model defined by a characterization matrix [T] having four rows and three columns of parameters, said columns determining the X, Y, and Z components of the target's magnetic dipole in said target centered coordinate system, said first three parameters of each said column defining the relative importance of the X, Y, and Z values of the ambient magnetic field in target centered coordinates in determining the induced components of that component of the magnetic dipole and the fourth parameter of each said column defining the relative importance of the corresponding permanent component in determining that component of the magnetic dipole.

5. The method of claim 4, wherein each said characterization matrix [T] is computed by:

h) defining a magnetic dipole matrix [M] having k rows and three columns, an ambient field matrix [F] having k rows and four columns, said fourth column being a constant vector, and a target centered coordinate system;

i) passing the candidate target through an ambient magnetic field with a given heading;

j) collecting magnetic field measurements of the target as it passes through the field;

k) computing the target's magnetic dipole and heading in a three-dimensional reference coordinate system, said magnetic dipole being represented by a vector $\underline{m}_{act}$ of length three whose elements are the components of the magnetic dipole in the respective dimensions of the reference coordinate system;

l) measuring the ambient field in the three-dimensional reference coordinate system, said ambient field being represented by a vector $\underline{F}$ of length three whose elements are the components of the ambient field in the respective dimensions of the reference coordinate system;

m) rotating the target's magnetic dipole vector $\underline{m}_{act}$ and the measured ambient field vector $\underline{F}$ into the target centered coordinate system;

n) placing the rotated magnetic dipole vector $\underline{m}_{act}$ and rotated ambient field vector $\underline{F}$ into the next row in the magnetic dipole matrix [M] and ambient field matrix [F], respectively;

o) repeating steps i through n k times under different ambient magnetic field conditions and with different target headings; and p) solving the matrix equation [M]=[F][T] for the values of the characterization parameters in matrix [T] that satisfy a selected error function.

6. The method of claim 5, wherein the matrix equation is solved using a lease squares error solution, in which $[T]=([F]^T[F])^{-1}[F]^T[M]$ and k is at least four such that $[F]^T[F]$ is invertible.

7. A method of classifying a target, comprising:
a) providing a library of candidate targets that are each characterized by a different permanent magnetic dipole and by an interaction with a given ambient magnetic field at a given orientation with respect to the target that produces an induced magnetic dipole;
b) collecting a set of actual magnetic field measurements of a target;
c) computing the target's heading and magnetic dipole in an array coordinate system;
d) measuring the ambient magnetic field;
e) computing the induced magnetic dipole for each said candidate target from the measured ambient magnetic field and the target's heading;
f) adding the candidate targets' induced magnetic dipoles to their respective permanent magnetic dipoles to produce respective total magnetic dipoles; and
g) classifying the target as the candidate target whose total magnetic dipole is the best match to the target's magnetic dipole.

8. The method of claim 7, wherein each said candidate target's permanent magnetic dipole and its interaction with a given ambient field are represented in a target centered coordinate system, said method comprising rotating the e target's magnetic dipole and the ambient field into the target centered coordinate system.

9. The method of claim 8, wherein each said candidate target's permanent magnetic dipole and its interaction with a given ambient field are computed by:
h) passing the candidate target through an ambient magnetic field with a given heading;
i) collecting magnetic field measurements of the target as it passes through the field;
j) computing the target's magnetic dipole and heading in a three-dimensional reference coordinate system;
k) measuring the ambient field in the three-dimensional reference coordinate system;
l) rotating the target's magnetic dipole and the measured ambient field into the target centered coordinate system;
m) accumulating the rotated magnetic dipoles and rotated ambient fields;
m) repeating steps h through m k times under different ambient magnetic field conditions and with different target headings; and
o) solving for the function that maps the rotated ambient fields into their associated rotated magnetic dipoles in accordance with a selected error function.

10. The method of claim 8, wherein each said candidate target's permanent magnetic dipole and its interaction with a given ambient field is modeled as a first order linear function by a characterization matrix [T] having four rows and three columns of parameters, said columns determining the X, Y, and Z components of the target's total magnetic dipole in said target centered coordinate system, said first three parameters of each said column defining the relative importance of the X, Y, and Z values of the ambient magnetic field in determining that component of the induced magnetic dipole and the fourth parameter of each said column defining the relative importance of the corresponding permanent component in determining that component of its magnetic dipole.

11. The method of claim 10, wherein each said characterization matrix F is computed by:

h) defining a magnetic dipole matrix [M] having k rows and three columns, an ambient field matrix [F] having k rows and four columns, said fourth column being a constant vector, and a target centered coordinate system;
i) passing the candidate target through an ambient magnetic field with a given heading;
j) collecting magnetic field measurements of the target as it passes through the field;
k) computing the target's magnetic dipole and heading in a three-dimensional reference coordinate system, said magnetic dipole being represented by a vector $\underline{m}_{act}$ of length three whose elements are the components of the magnetic dipole in the respective dimensions of the reference coordinate system;
l) measuring the ambient field in the three-dimensional reference coordinate system, said ambient field being represented by a vector $\underline{F}$ of length three whose elements are the components of the ambient field in the respective dimensions of the reference coordinate system;
m) rotating the target's magnetic dipole vector $\underline{m}_{act}$ and the measured ambient field vector $\underline{F}$ into the target centered coordinate system;
n) placing the rotated magnetic dipole vector $\underline{m}_{act}$ and rotated ambient field vector $\underline{F}$ into the next row in the magnetic dipole matrix [M] and ambient field matrix [F], respectively;
o) repeating steps i through n k times under different ambient magnetic field conditions and with different target headings; and
p) solving the matrix equation [M]=[F][T] for the values of the characterization parameters in matrix [T] that satisfy a selected error function.

12. The method of claim 11, wherein the matrix equation is solved using a lease squares error solution, in which $[T]=([F]^T[F])^{-1}[F]^T[M]$ and k is at least four such that $[F]^T[F]$ is invertible.

13. A method of classifying a target using an array of spatially distributed magnetic sensors, comprising:
generating a library of characterization matrices [T] for a plurality of candidate targets, each said matrix [T] characterizing what the magnetic dipole will be in target centered coordinate system for that target in a given ambient field, comprising:
a) selecting a candidate target;
b) passing the candidate target through an ambient magnetic field with a given heading;
c) collecting magnetic field measurements of the target as it passes through the field;
d) computing the target's magnetic dipole and heading in a first reference coordinate system;
e) measuring the ambient field in the first reference coordinate system;
f) rotating the target's magnetic dipole and the measured ambient field into the target centered coordinate system;
g) storing the rotated magnetic dipoles and rotated ambient fields;
h) repeating steps b through g k times under different ambient magnetic field conditions and with different target headings;
i) solving for the matrix [T] that maps the rotated ambient fields into their associated rotated magnetic dipoles in accordance with a selected error function; and j) selecting a different candidate target and repeating steps b through i;

computing the heading and magnetic dipole of a target passing through an array of magnetic sensors, comprising:

k) collecting a set $\underline{B}$ of actual magnetic field measurements;

l) modeling the set $\underline{B}$ as the product of a spatial/temporal characterization matrix [R] that relates the position of the target over some period of time to the positions of the magnetic sensors in a second reference coordinate system and the target's magnetic dipole m in the second reference coordinate system;

m) correlating the measured set B with the modeled product [R]$\underline{m}$ to solve for the target's heading and magnetic dipole $\underline{m}$ in the reference coordinate system; and classifying the target as the one or more candidate targets from the library, comprising:

n) rotating the target's magnetic dipole $\underline{m}$ into a target centered coordinate system based upon the target's heading to produce an actual magnetic dipole $\underline{m}_{act}$;

o) measuring the ambient magnetic field $\underline{F}$ present in the array;

p) rotating the ambient magnetic field $\underline{F}$ into the target centered coordinate system and appending a constant to increase its length by one;

q) multiplying the rotated ambient magnetic field [F] with the candidate targets' characterization matrices [T] to generate respective candidate magnetic dipoles $\underline{m}_T$ in the target centered coordinate system; and r) classifying the actual magnetic dipole as the one or more targets whose candidate magnetic dipoles $\underline{m}_T$ are most closely matched to the actual magnetic dipole $\underline{m}_{act}$.

14. The method of claim 13, wherein said characterization matrix [T] is a first order linear model having four rows and three columns of parameters, said columns determining the X, Y, and Z components of the target's magnetic dipole in said target centered coordinate system, said first three parameters of each said column defining the relative importance of the X, Y, and Z values of the ambient magnetic field in determining the induced component of that component of the magnetic dipole and the fourth parameter of each said column defining the relative importance of the corresponding permanent component in determining that component of the actual magnetic dipole, said library being generated by:

defining a magnetic dipole matrix [M] having k rows and three columns, an ambient field matrix [F] having k rows and four columns, said fourth column being a unity vector, and a target centered coordinate system;

placing the rotated magnetic dipole vector $\underline{m}_{act}$ and rotated ambient field vector $\underline{F}$ into the next row in the magnetic dipole matrix [M] and ambient field matrix [F], respectively; and solving the matrix equation [M]=[F][T] for the values of the characterization parameters using a least squares error solution, in which $[T]=([F]^T[F])^{-1[F]T}[M]$ and k is at leak four such that $[F]^T[F]$ is invertible.

15. The method of claim 13, wherein the target's heading and magnetic dipole are solved for in step m by:

maximizing the expression $\underline{B}^T[R]([R]^T[R])^{-1}[R]^T\underline{B}$, which gives the target's position and velocity;

computing the target's heading as the arctangent to its velocity; and computing the target's magnetic dipole $\underline{m}_{act}=([R]^T[R])^{-1}[R]^T\underline{B}$.

16. A method of classifying a target using an array of spatially distributed magnetic sensors, comprising:

a) providing a library of characterization matrices [T] for a plurality of candidate targets where each matrix [T] has four rows and three columns of parameters that together define a first order linear model for predicting that target's magnetic dipole in target centered coordinates for a given ambient magnetic field, said columns respectively determining the X, Y, and Z components of the target's magnetic dipole, said first three parameters of each said column defining the relative importance of the X, Y, and Z values of the ambient magnetic field in determining the induced component of that component of target's magnetic dipole and the fourth parameter of each said column defining the relative importance of the corresponding permanent component in determining that component of its magnetic dipole;

b) collecting a set $\underline{B}$ of actual magnetic field measurements of a target passing through an array of magnetic sensors;

c) modeling the set $\underline{B}$ as the product of a spatial/temporal characterization matrix [R] that relates the position of the target over some period of time to the positions of the magnetic sensors in a three-dimensional reference coordinate system and the target's magnetic dipole vector M in the reference coordinate system;

d) maximizing the expression $\underline{B}^T[R]([R]^T[R])^{-1}[R]^T\underline{B}$, which gives the target's position and velocity;

e) computing the target's heading as the arctangent to its velocity;

f) computing the target's magnetic dipole $\underline{m}_{act}=([R]^T[R])^{-1}[R]^T\underline{B}$;

g) measuring an ambient magnetic field vector $\underline{F}$;

h) appending a constant to the ambient magnetic field vector $\underline{F}$ thereby increasing its length by one;

i) rotating the target's magnetic dipole $\underline{m}_{act}$ and the appended ambient magnetic field vector $\underline{F}$ into target centered coordinates;

j) computing a predicted magnetic dipole $\underline{m}^T=\underline{F}[T]$ for each said candidate target; and k) classifying the target as the candidate target whose magnetic dipole is the best match to the target's magnetic dipole $\underline{m}_{act}$.

17. The method of claim 16, wherein each said characterization matrix [T] is computed by:

l) defining a magnetic dipole matrix [M] having k rows and three columns, an ambient field matrix [F] having k rows and four columns, said fourth column being a unity vector, and a target centered coordinate system;

m) passing the candidate target through an ambient magnetic field with a given heading;

n) collecting magnetic field measurements of the target as it passes through the field;

o) computing the target's magnetic dipole and heading in a three-dimensional reference coordinate system, said magnetic dipole being represented by a vector $\underline{m}_{act}$ of length three whose elements are the components of the magnetic dipole in the respective dimensions of the reference coordinate system;

p) measuring the ambient field in the three-dimensional reference coordinate system, said ambient field being represented by a vector $\underline{F}$ of length three whose elements are the components of the ambient field in the respective dimensions of the reference coordinate system;

q) rotating the target's magnetic dipole vector $\underline{m}_{act}$ and the measured ambient field vector $\underline{F}$ into the target centered coordinate system;

r) placing the rotated magnetic dipole vector $\underline{m}_{act}$ and rotated ambient field vector $\underline{F}$ into the next row in the magnetic dipole matrix [M] and ambient field matrix [F], respectively;

s) repeating steps 1 through r k times under different ambient magnetic field conditions and with different target headings; and t) solving the matrix equation [M]=[F][T] for the values of the characterization parameters in matrix [T] that satisfy a selected error function.

18. The method of claim 17, wherein the matrix equation is solved using a lease squares error solution, in which $[T]=([F]^T[F])^{-1}[F]^T[M]$ and k is at least four such that $[F]^T[F]$ is invertible.

19. A system for classifying a magnetic target, comprising:

an array of magnetic sensors that take magnetic field measurements of a target passing through an array and sense an ambient magnetic field;

a computer comprising:
  an input port for receiving the magnetic field measurements and the ambient magnetic field represented in reference coordinates;
  a memory for storing a library of characterization matrices [T] for a plurality of candidate targets, each said matrix [T] defining the interaction of the candidate target with a given ambient field represented in target centered coordinates which generates an induced magnetic dipole and specifying the candidate target's permanent magnetic dipole;
  a processor that computes the target's magnetic dipole, location, velocity and heading, rotates the magnetic dipole and ambient magnetic field into target centered coordinates, multiplies each said characterization matrix [T] by the rotated ambient field to produce candidate magnetic dipoles, and classifies the target as the candidate target whose magnetic dipole is the best match to the target's magnetic dipole; and
  a display that displays the target's location and velocity and identifies it as the classified target.

20. The system of claim 19, wherein said characterization matrix [T] has four rows and three columns of parameters, said columns determining the X, Y, and Z components of the target's magnetic dipole in said target centered coordinates, said first three parameters of each said column defining the relative importance of the X, Y, and Z values of the ambient magnetic field in target centered coordinates in determining the induced components of that component of the magnetic dipole and the fourth parameter of each said column defining the relative importance of the corresponding permanent component in determining that component of the magnetic dipole.

21. The system of claim 20, wherein the computer computes the characterization matrices [T] by:

a) defining a magnetic dipole matrix [M] having k rows and three columns and an ambient field matrix [F] having k rows and four columns, said fourth column being a constant vector;

b) passing the candidate target through an ambient magnetic field with a given heading;

c) collecting magnetic field measurements of the target as it passes through the field;

d) computing the target's magnetic dipole and heading in reference coordinates, said magnetic dipole being represented by a vector $\underline{m}_{act}$ of length three whose elements are the components of the magnetic dipole in the respective dimensions of the reference coordinate system;

e) measuring the ambient field in the three-dimensional reference coordinates, said ambient field being represented by a vector $\underline{F}$ of length three whose elements are the components of the ambient field in the respective dimensions of the reference coordinates;

f) rotating the target's magnetic dipole vector $\underline{m}_{act}$ and the measured ambient field vector $\underline{F}$ into target centered coordinates;

g) placing the rotated magnetic dipole vector $\underline{m}_{act}$ and rotated ambient field vector $\underline{F}$ into the next row in the magnetic dipole matrix [M] and ambient field matrix [F], respectively;

h) repeating steps b through g k times under different ambient magnetic field conditions and with different target headings; and i) solving the matrix equation [M]=[F][T] for the values of the characterization parameters in matrix [T] that satisfy a selected error function.

22. The method of claim 21, wherein the matrix equation is solved using a lease squares error solution, in which $[T]=([F]^T[F])^{-1}[F]^T[M]$ and k is at least four such that $[F]^T[F]$ is invertible.

* * * * *

UNITED STATES PATENT AND TRADEMARK OFFICE
CERTIFICATE OF CORRECTION

PATENT NO : 5,831,873
DATED : November 3, 1998
INVENTOR(S) : Kirk K. Kohnen, et al.

It is certified that error appears in the above-identified patent and that said Letters Patent are hereby corrected as shown below:

At the top of column 1, please insert the following paragraph:

--This invention was made with Government support under Contract No. N00030-93-C-002 awarded by the Department of the Navy. The Government has certain rights in this invention.--

Signed and Sealed this

Fourteenth Day of December, 1999

Attest:

Q. TODD DICKINSON

*Attesting Officer*  *Acting Commissioner of Patents and Trademarks*